(12) United States Patent
Perry

(10) Patent No.: US 9,718,007 B2
(45) Date of Patent: Aug. 1, 2017

(54) MODULAR STORMWATER FILTRATION

(71) Applicant: C4S LLC, Silverdale, WA (US)

(72) Inventor: Ken Perry, Silverdale, WA (US)

(73) Assignee: C4S LLC, Bremerton, WA (US)

(*) Notice: Subject to any disclaimer, the term of this patent is extended or adjusted under 35 U.S.C. 154(b) by 27 days.

(21) Appl. No.: 14/981,892

(22) Filed: Dec. 28, 2015

(65) Prior Publication Data
US 2017/0136392 A1   May 18, 2017

Related U.S. Application Data

(60) Provisional application No. 62/256,108, filed on Nov. 16, 2015.

(51) Int. Cl.
| | |
|---|---|
| *E03F 5/04* | (2006.01) |
| *B01D 24/22* | (2006.01) |
| *B01D 29/56* | (2006.01) |
| *B01D 35/34* | (2006.01) |
| *B01D 29/96* | (2006.01) |
| *B01D 29/58* | (2006.01) |
| *C02F 1/00* | (2006.01) |
| *B01D 29/05* | (2006.01) |
| *B01D 24/00* | (2006.01) |
| *C02F 103/00* | (2006.01) |

(52) U.S. Cl.
CPC ............ *B01D 29/96* (2013.01); *B01D 24/007* (2013.01); *B01D 24/22* (2013.01); *B01D 29/05* (2013.01); *B01D 29/56* (2013.01); *B01D 29/58* (2013.01); *B01D 35/34* (2013.01); *C02F 1/001* (2013.01); *E03F 5/0404* (2013.01); *C02F 2103/001* (2013.01); *C02F 2201/007* (2013.01)

(58) Field of Classification Search
CPC ..... E03F 5/0404; B01D 24/007; B01D 24/22; B01D 29/03; B01D 29/05; B01D 29/56; B01D 35/30; B01D 35/34; C02F 2103/001; C02F 2201/007
USPC .......... 210/170.03, 232, 239, 266, 284, 289, 210/335, 339
See application file for complete search history.

(56) References Cited

U.S. PATENT DOCUMENTS

| | | | | |
|---|---|---|---|---|
| 1,730,581 | A | * | 10/1929 | McMachen .......... B01D 24/008 210/284 |
| 2,793,754 | A | * | 5/1957 | Yeiser ................... B01D 29/05 210/328 |
| 5,223,154 | A | * | 6/1993 | MacPherson, Jr. .... B01D 29/05 210/163 |

(Continued)

FOREIGN PATENT DOCUMENTS

DE   202013101256   * 8/2013

*Primary Examiner* — Christopher Upton
(74) *Attorney, Agent, or Firm* — Galvin Patent Law LLC; Brian R. Galvin

(57) ABSTRACT

A modular drainage filtration apparatus comprising a filtration container having an open-ended structure with a shape determined by the number of walls used during assembly, each wall being formed from a generally flat sheet of a rigid material and comprising a flat body portion with a plurality of formed tabs and an upper and lower overhanging portion, the walls being assembled to form a filtration container enclose an interior region and having open and opposite upper and lower faces and a plurality of filtration units each comprising a flat filter stage configured to be placed within a filtration container.

4 Claims, 4 Drawing Sheets

(56) References Cited

U.S. PATENT DOCUMENTS

| | | | | |
|---|---|---|---|---|
| 5,788,849 | A | * | 8/1998 | Hutter, Jr. ............. E03F 5/0404 210/170.03 |
| 6,013,180 | A | * | 1/2000 | Wang ...................... C02F 1/003 210/232 |
| 8,157,991 | B2 | * | 4/2012 | Wilhelms ................ E03F 1/002 210/170.03 |
| 2009/0127181 | A1 | * | 5/2009 | Staschik ................... C02F 3/04 210/284 |
| 2013/0081992 | A1 | * | 4/2013 | Chavanne .......... B01D 29/0095 210/323.1 |
| 2014/0190883 | A1 | * | 7/2014 | Handa ................... B01D 29/56 210/337 |

* cited by examiner

MODULAR STORMWATER FILTRATION

CROSS-REFERENCE TO RELATED APPLICATIONS

This application claims priority to U.S. provisional patent application Ser. No. 62/256,108, titled, "MODULAR DRAINAGE FILTRATION", which was filed on Nov. 16, 2015, the entire specification of which is incorporated herein by reference.

BACKGROUND OF THE INVENTION

Field of the Art

The disclosure relates to the field of stormwater filtration, and more particularly to a stormwater filtration device and its modular assembly.

Discussion of the State of the Art

In the field of stormwater filtration, properties are often equipped with stormwater drainage systems to direct runoff from rainfall or other precipitation. Generally, these systems are arranged about parking or other flat spaces at the ground level where stormwater may be dispersed into the soil or into a drainage system such as to utilize runoff in a water utility. This runoff may have collected any number of contaminants from various sources, such as acids or particulate matter from the air as precipitation fell, debris that was caught in the water flow on the roof or in the drainage system, or contaminants from the structure itself such as metal ions, hydrocarbons, or other chemicals.

Filtering and cleaning the water runoff is generally costly, and involves custom-fitted and bulky equipment that is installed into the drainage system on a structure, often tailored to filtering specific contaminants or materials. This equipment is costly to produce and install, and is inefficient to transport due to its bulky nature.

What is needed, is a means to provide filtration in structure drainage systems, that utilizes a modular design to be easily tailored to treat specific contaminants as needed, and that is designed to be transported, assembled, and installed in an efficient manner, that lowers cost of entry for filtration to drive adoption and improve existing implementations.

SUMMARY OF THE INVENTION

Accordingly, the inventor has conceived and reduced to practice, in a preferred embodiment of the invention, an apparatus for modular stormwater filtration, that may be produced and transported in efficient flat-pack form, and that uses a modular design to be assembled and customized to a particular structure's needs using single or multiple-stage filtration through the arrangement of modular filter units within the apparatus.

In a preferred embodiment of the invention, a modular stormwater filtration container having an open-ended structure and comprising a plurality of at least semi-rigid walls, each wall being formed from or machined into a single sheet of at least semi-rigid material and configured to be assembled to form a container enclosing an inner region and having open and opposite upper and lower base surfaces to form an open-ended structure with the number of side rectangle faces being determined by the number of walls used during assembly; a plurality of filter stages each comprising at least a flat sheet or panel of filter material configured to filter a fluid passing through the filter material, and configured to conform to the shape of an open base of an assembled modular filtration container; wherein at least a portion of the plurality of walls each respectively comprise at least an upper overhanging portion comprising a rigid portion of material oriented perpendicular to an upper edge of the wall and oriented away from an inner region enclosed by the assembled container; wherein at least a portion of the plurality of walls each respectively comprise at least a lower overhanging portion comprising a rigid portion of material oriented perpendicular to a lower edge of the wall and oriented inward toward an inner region enclosed by the assembled container; wherein at least a portion of the plurality of walls each respectively comprise a plurality of formed S-fold portions configured to apply mechanical pressure to a sheet of material inserted into the S-fold; wherein at least a portion of the plurality of walls each respectively comprise a plurality of inlet tabs, each inlet tab comprising at least a triangular region of a wall that is separated along all but one edge and configured to be creased or folded inward to form an opening in the surface of the wall; wherein at least a portion of the walls are assembled via inserting a portion of the wall material into an S-fold portion of an adjacent wall; and wherein the plurality of filter stages are placed within the inner region enclosed by the modular stormwater filtration apparatus, and rest upon the plurality of lower overhanging portions, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Detailed Description of Exemplary Embodiments

Figure 1:
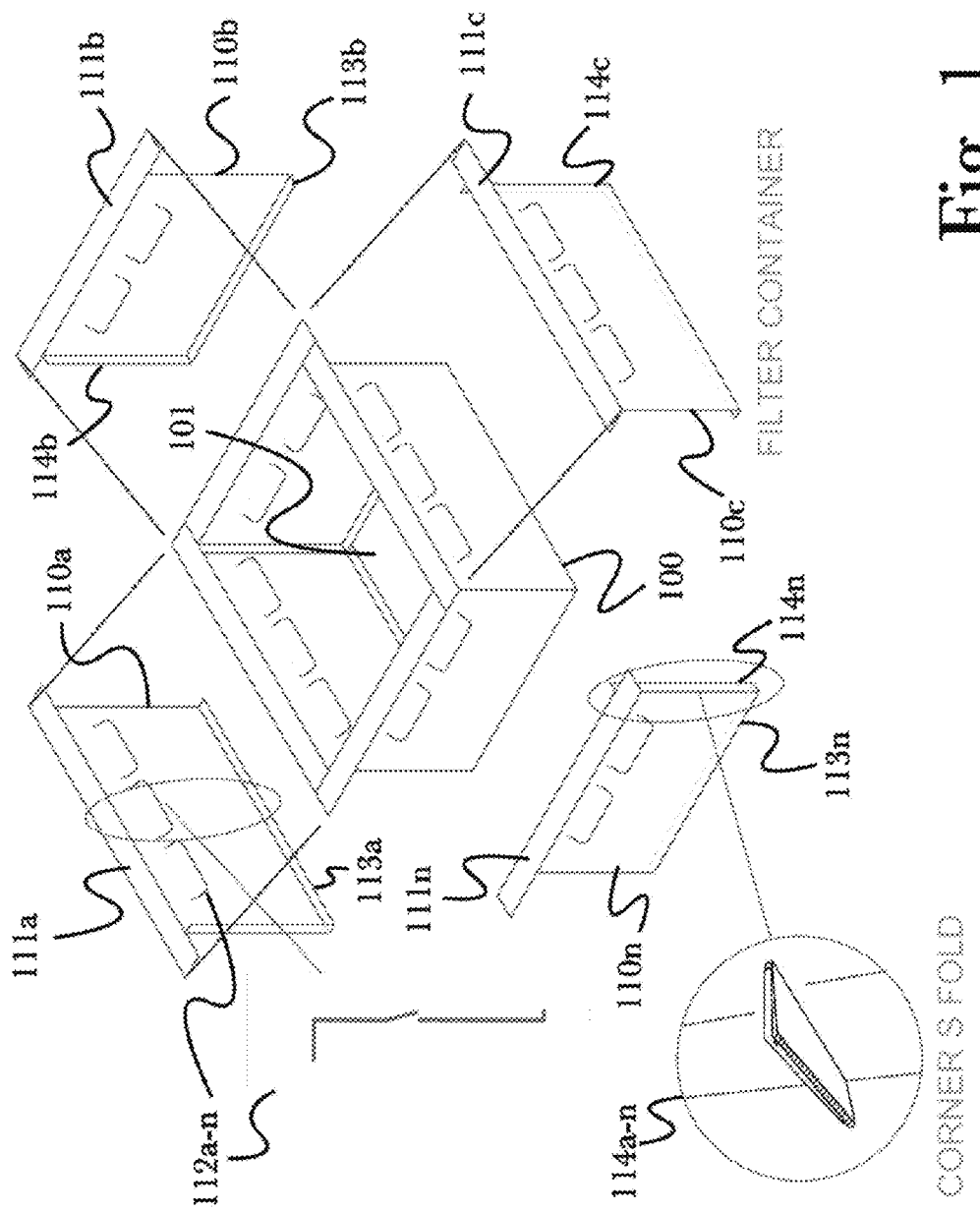
FIG. 1 is an illustration of an exemplary arrangement of a modular stormwater filtration container according to a preferred embodiment of the invention, illustrating assembly from flat-construction portions.

FIG. 1 is an illustration of an exemplary arrangement of a modular drainage filtration container 100 according to a preferred embodiment of the invention, illustrating assembly from flat-construction portions 110a-n.

Figure 4:
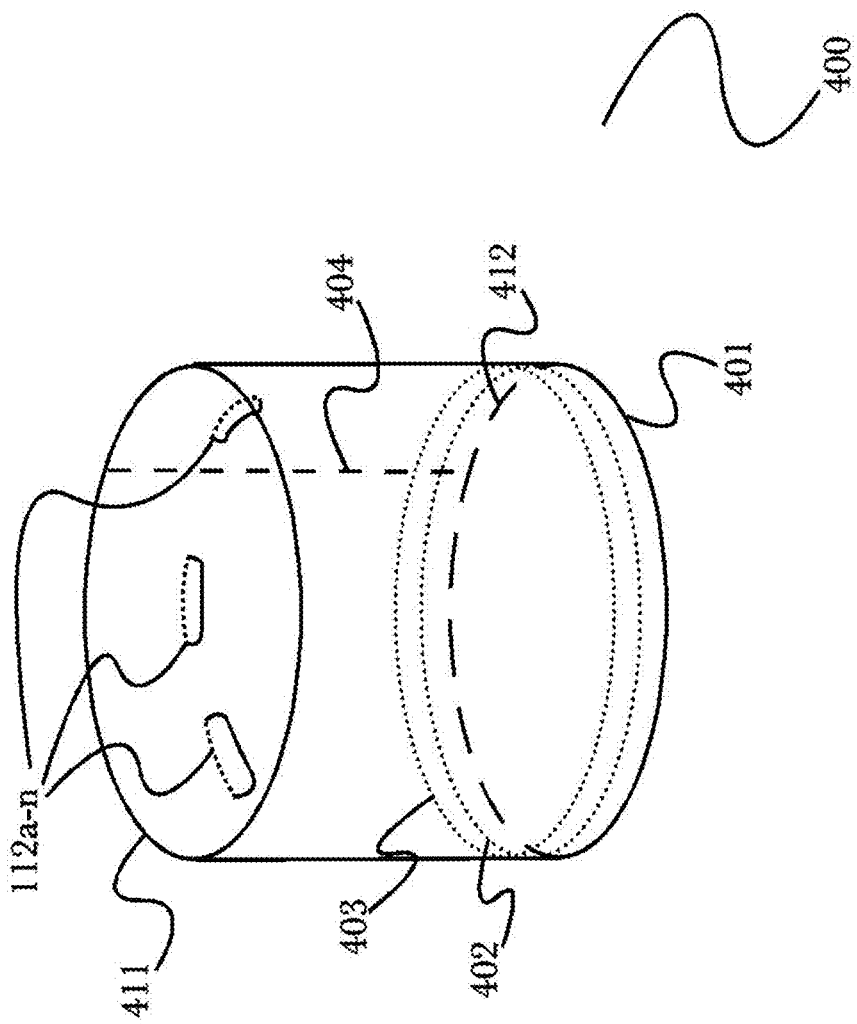
FIG. 4 is an illustration of an exemplary arrangement of a modular stormwater filtration apparatus, illustrating the use of a single-walled elliptical container.

According to the embodiment, a modular drainage filtration container 100 may comprise a generally box-type frame having rigid walls 110a-n (generally four walls of rectangular shape to be assembled into a rectangular cube container as illustrated, however it should be appreciated that other final shapes or numbers of walls may be used according to a desired arrangement or use case, such as using six walls to form a hexagonal prism, or a single-wall arrangement to form a circular or elliptical container as illustrated below with reference to FIG. 4, or other arrangements) formed of an impermeable or semipermeable material such as metal or polymer, and configured to enclose an open central region 101 within the walls 110a-n when assembled and having open and opposite top and bottom faces with respect to the ground. Each wall 110a-n may be formed from or machined into a single sheet of material, such as by cutting or stamping sheet metal for simple and cost-effective production as well as efficient packaging for transport. It should also be appreciated that more complex or alternate construction may be utilized, such as assembly from multiple precut sheets of material (for example, via welding or fastening), however a single-sheet construction is preferred for efficiency as envisioned by the inventor.

According to the embodiment, each wall 110a-n may have a formed perpendicular portion 111a-n along one edge, oriented outward from the center of a final assembled container to form a "lip" or overhang when assembled (that is, the upper open face of an assembled container 100 has an outward-flared overhanging edge). This overhanging portion may be used when placing the container within a stormwater catch basin (as may be found positioned about flat or open areas such as parking lots), drainage duct or other duct, pipe, or opening, the overhang being used to affix the container at the entrance or exit and prevent the container from passing completely into (or falling out of) the duct (generally by resting upon the edge of the opening into which the container 100 is being placed or by positioning against a flange or lip, however it should be appreciated that some or all overhanging portions 111a-n may be inserted into or affixed upon a variety of receiving hardware arrangements for more secure fastening within a duct or opening, for example using adhesive or mounting hardware such as screws or clips). For example, a number of stormwater drainage ducts may be positioned around large open spaces such as parking lots, laydown areas, dock facilities, open-air storage facilities, gas stations, or other such open spaces. Each of these drainage ducts may collect runoff from precipitation, spills, and other liquid drainage that may be carrying a wide variety of contaminants. For example, in a parking area or gas station, water runoff may be contaminated with various hydrocarbons from fuel spillage and vehicle fluids or emissions. In a dock facility, water runoff may be directed into a body of water and therefore removal of contaminants may be a key environmental or regulatory concern. In such arrangements, each of a number of drainage ducts may be fitted with a modular stormwater drainage apparatus 300 according to the embodiments disclosed herein, providing a means for easy and effective filtration of contaminants according to the nature of a particular arrangement and with minimal cost or time required to setup and install.

In another example using a rooftop drainage configuration, a container 100 may be placed into the entrance of a downward drainage duct so that water runoff passes through the interior region 101 of the container 100 as it is directed downward toward the ground. Additionally, some or all walls 110a-n may further comprise a second perpendicular portion 113a-n around an opposite edge from a first overhang 111a-n, oriented to form an overhanging lip or edge in the opposite direction (that is, oriented toward an inner region 101 when assembled). This second overhang 113a-n may be used to contain a plurality of filter stages as described below (referring to FIG. 2-3), for example by providing a resting surface for filter stages to be placed upon without falling through the open bottom of an inner region 101 of an assembled container 100.

Each wall 110a-n of a container 100 may also comprise a plurality of formed or machined "s-folds" 114a-n, wherein a portion of the wall material at an edge is formed into a recurved shape having a cross-section with the appearance of an "S" shape (for example, by folding the flat material of a wall over upon itself to create the S-fold). These S-folds 114a-n may be used to apply mechanical tension when interlocked with another wall (for example, by inserting a portion of a wall 110a-n into an S-fold 114a-n, or by inserting two S-folds 114a-n into one another), holding the assembled container 100 together without the need of attachment hardware or adhesive, facilitating rapid modular assembly and disassembly while maintaining robust construction during use.

Each wall 110a-n may further comprise a plurality of formed or machined inlet tabs 112a-n, the tabs each respectively comprising a portion (generally rectangular as shown, but other shapes may be used) of material that is cut, punched, or otherwise severed from the main portion of the wall along all but one edge of the tab (thereby forming a portion of material that may be folded or creased along this remaining edge that is still connected to the main body of material forming a wall 110a-n), and may then be folded or creased inward toward the interior region 101 of the assembled container 100, thereby forming an opening in the wall 110a-n. These inlet tabs 112a-n may be oriented to direct the flow of a fluid such as water in an inward and downward direction, providing a directed and controlled flow into the interior region 101 of an assembled container 100.

When assembling a final apparatus 300 for modular stormwater filtration (described below, referring to FIG. 3), a number of flat preformed or pre-fabricated sheets may be assembled to form a modular drainage container 100 as described above (optionally after being formed into walls 110a-n if needed, for example by manually creasing inlet tabs 112a-n that are initially flat or flush with the rest of the wall), and then a number of filtration units may be placed within the interior of the container to rest on lower overhanging edges 113a-n such that they rest upon the overhanging edges 113a-n perpendicular to the walls 110a-n forming the container 100 into which they are placed. In this manner, flowing water (or other fluid) may be directed through inlet tabs 112a-n into an inner region 101 enclosed within the container 100, and downward to flow through a plurality of filter stages placed within the container 100 (as described below, referring to FIGS. 2-3).

It should also be appreciated that while reference is made to the use of a modular stormwater filtration apparatus 300 for purposes of filtering water runoff from precipitation in open spaces, it may also be possible to utilize the apparatus of the invention in other ways such as for filtration in drainage systems for factories or laboratories (where removing chemicals and contaminants may be a key concern in drainage or water outlet systems), or for filtration in uses other than drainage or runoff, such as in-line filtration within a pipe or tube for transporting liquid to a destination, such as within a water utility or in a water (or other liquid) treatment or bottling facility.

Figure 2:
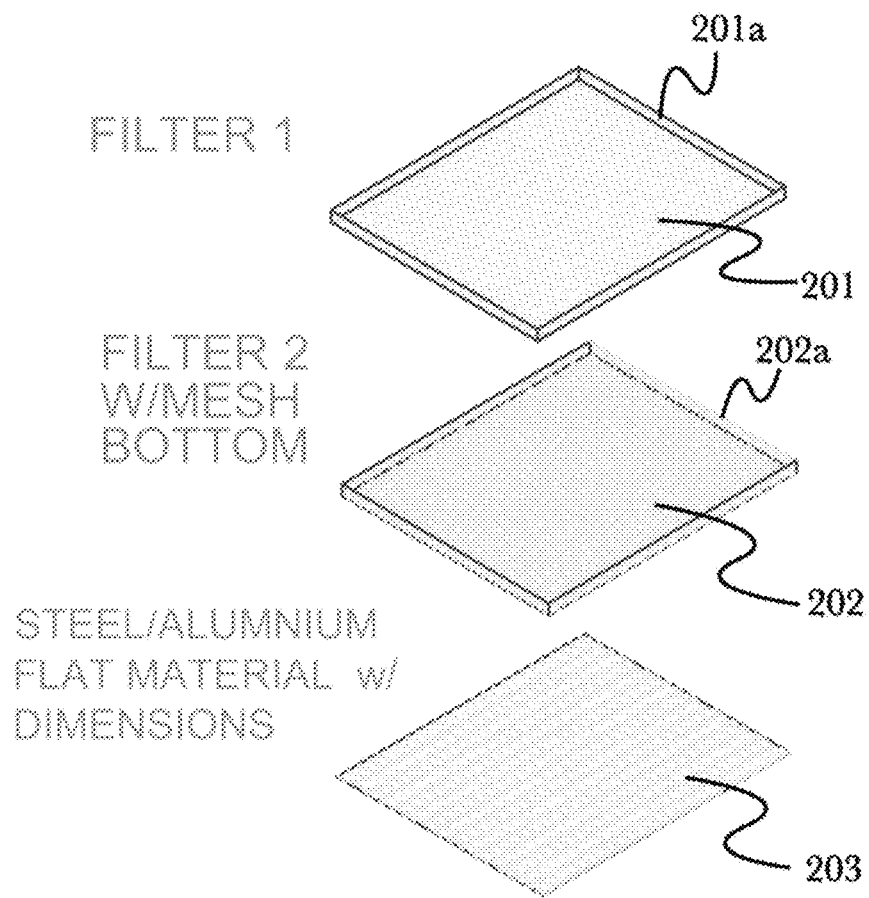
FIG. 2 is an illustration of several exemplary modular stormwater filter stages according to a preferred embodiment of the invention.

FIG. 2 is an illustration of several exemplary modular drainage filter stages 201-203 according to a preferred embodiment of the invention. According to the embodiment, a variety of drainage filter stages 201-203 may be utilized in various combinations to achieve a desired filtration result. For example, a mesh filter stage 201 may be used to remove large debris or particulate matter from water passing through a filtration apparatus 300, for example plant matter or small particles that may have been accumulated by water flowing over portions of a structure or property. According to a particular arrangement or use case, a filter stage may further comprise a plurality of raised or overhanging edges 201a, 202a to facilitate a degree of standoff from additional stages or from the walls of a filter container into which the stage is placed. For example, when placing multiple filter stages 201-203 in a stacked configuration for multi-stage filtration, a standoff may aid in water flow rate by allowing a gap between each filter stage for water to flow freely between filtration stages. Additional filters such as carbon, ceramic, or recycled hydrophobic material filters may be utilized for specific purposes such as to remove metal ions or hydrocarbon contaminants, and multiple filters may be stacked on top of each other within a filtration apparatus to provide a multi-stage filtration arrangement. For example, a second filter stage 202 may be used for a second filter stage after an initial debris filter 201, for example a filter using activated carbon to filter out dissolved contaminants. Any particular filter stage may also have a mesh layer on a top or bottom surface to improve water flow through and around the filter stage, to assist in preventing a pooling of water or clogging of a filtration container (optionally in conjunction with a plurality of raised or overhanging standoff edges 201a, 202a). An optional rigid filter support 203 may be placed on the bottom (that is, it may be placed initially into a filtration container with filter stages stacked on top of it in reverse order, such that water flows through each successive stage from top to bottom as it passes downward through an assembled filtration apparatus 300), for example using a metal mesh to provide mechanical support for filter stages placed on top. This support may be used to prevent sagging or collapse when in use, for example if using heavy filter materials or filtering a large volume of water that may soak filter stages to the point of sagging under load.

Figure 3:
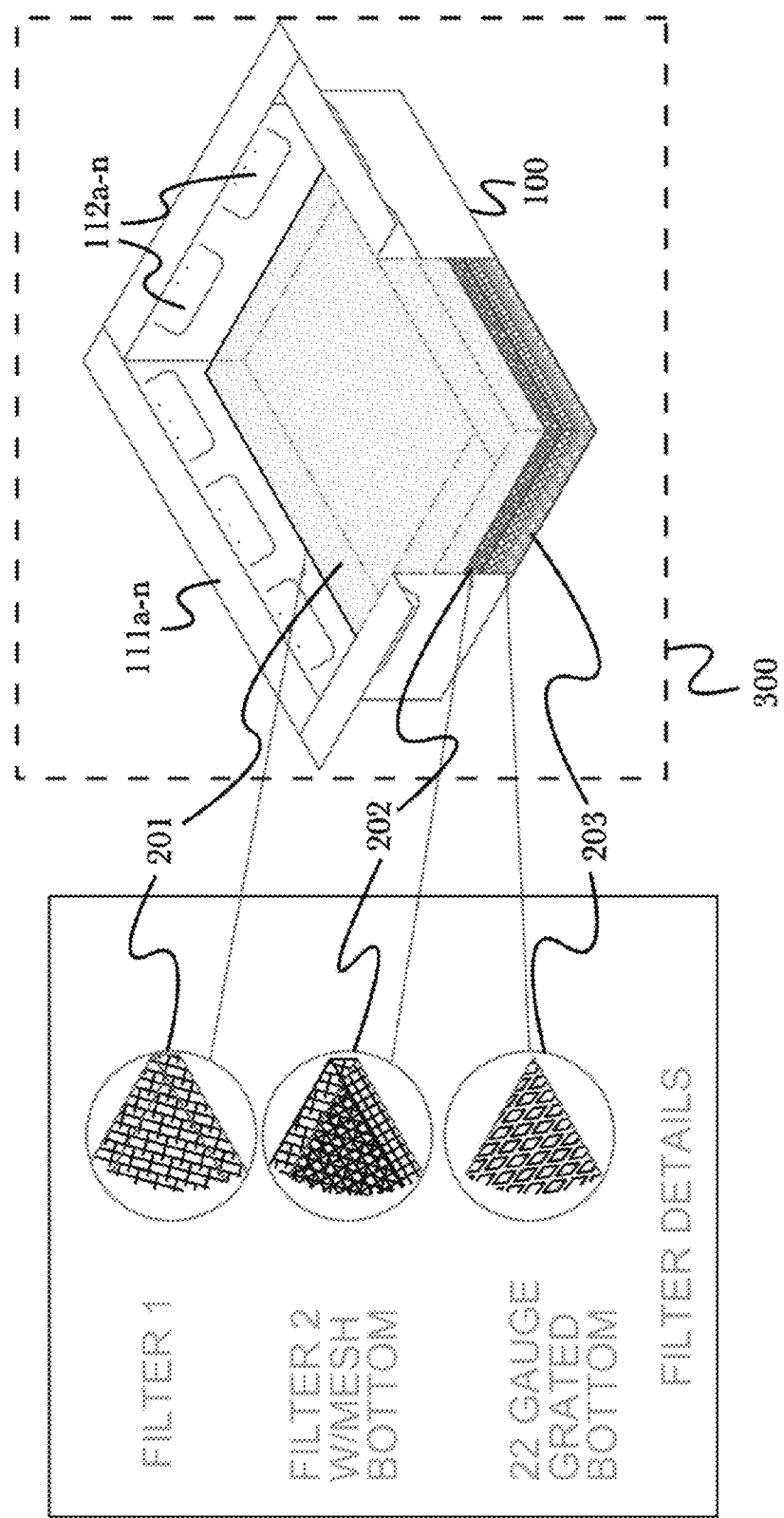
FIG. 3 is an illustration of an exemplary arrangement of a modular stormwater filtration apparatus according to a preferred embodiment of the invention, illustration the arrangement of multiple drainage filter stages within a drainage filtration container for multiple-stage filtration.

FIG. 3 is an illustration of an exemplary arrangement of a modular building drainage filtration apparatus 300 according to a preferred embodiment of the invention, illustration the arrangement of multiple drainage filter stages 201-203 within a drainage filtration container 100 for multiple-stage filtration. According to the embodiment, multiple filter units 201-203 may be stacked on top of each other within a filtration apparatus 300, for example placing a rigid mesh 203 such as an aluminum panel on the bottom to provide support for stacked filter units (for example, to prevent sagging), then placing a ceramic or carbon filter 202 to remove chemical contaminants or pathogens such as bacteria or protozoa, then placing a mesh filter 201 on top to remove particulate matter and debris. During use, water is directed into the interior region of an apparatus 300 via a plurality of inlet tabs 112a-n, and flows in a generally downward direction with gravity, passing through each successive stage of filtration from top to bottom and finally passing out of the filtration apparatus 300 and into a drainage duct or pipe. An assembled apparatus 300 may be placed into a drainage duct, pipe, or other opening by resting on upper overhanging portions 111a-n, so that the apparatus is held in the opening and does not pass fully into the duct or pipe as water (or other fluid) flows through it.

FIG. 4 is an illustration of an exemplary arrangement of a modular stormwater filtration apparatus 400, illustrating the use of a single-walled elliptical container 401. According to the embodiment, a single sheet or layer of material may be formed into a single-walled container 401, for example by curling, rolling, or otherwise shaping into a desired final arrangement and then fastening or adhering to itself to maintain the final arrangement, for example using a pair of mating S-folds 404 positioned at distal edges of the material sheet being used to form the wall, and configured to be interlocked to maintain mechanical tensions and reinforce the final shape of the container 401. The open upper 411 and lower 412 edges of the wall may incorporate overhanging edges such as a rolled or curled circumferential "lip", to perform the function of an overhanging portion for resting when inserted into a drainage port or other opening during assembly or operation.

According to the embodiment, a plurality of elliptical or circular filter stages 402, 403 may be placed inside an elliptical container 401, for example by resting upon an inwardly-curled or shaped edge or lip 412 around the open lower face of container 401. As with containers of other shapes, a first filter stage 402 may be placed on the bottom (such as a ceramic or other filter for final filtration of chemicals or pathogens), and then additional filter stages 403 may be placed upon it to provide initial filtration such as to remove particulate matter or debris. During operation, water may be directed inward and downward via a plurality of integrally-formed inlet tabs 112a-n, so that the flow of water is directed through filter stages from top to bottom to provide multi-stage filtration before passing through the open bottom of container 401.

The skilled person will be aware of a range of possible modifications of the various embodiments described above. Accordingly, the present invention is defined by the claims and their equivalents.

What is claimed is:

1. An apparatus for modular drainage filtration, comprising:
   a modular filtration container having an open-ended structure and comprising a plurality of at least semi-rigid walls, each wall being formed from or machined into a single sheet of at least semi-rigid material and configured to be assembled to form a container enclosing an inner region and having open and opposite upper and lower base surfaces to form an open-ended structure with the number of side rectangle faces being determined by the number of walls used during assembly;
   a plurality of filter stages each comprising at least a flat sheet or panel of filter material configured to filter a fluid passing through the filter material, and configured to conform to the shape of an open base of an assembled modular filtration container;
   wherein at least a portion of the plurality of walls each respectively comprise at least an upper overhanging portion comprising a rigid portion of material oriented perpendicular to an upper edge of the wall and oriented away from an inner region enclosed by the assembled container;
   wherein at least a portion of the plurality of walls each respectively comprise at least a lower overhanging portion comprising a rigid portion of material oriented perpendicular to a lower edge of the wall and oriented inward toward an inner region enclosed by the assembled container;
   wherein at least a portion of the plurality of walls each respectively comprise a plurality of formed S-fold portions configured to apply mechanical pressure to a sheet of material inserted into the S-fold;
   wherein at least a portion of the plurality of walls each respectively comprise a plurality of inlet tabs, each inlet tab comprising at least a triangular region of a wall that is separated along all but one edge and configured to be creased or folded inward to form an opening in the surface of the wall;

wherein at least a portion of the walls are assembled via inserting a portion of the wall material into an S-fold portion of an adjacent wall; and wherein the plurality of filter stages are placed within the inner region enclosed by the modular filtration apparatus, and rest upon the plurality of lower overhanging portions.

2. The apparatus of claim 1, wherein the number of walls is four, and the assembled apparatus has the shape of an open-ended rectangle.

3. The apparatus of claim 1, wherein at least one of the plurality of filter stages comprises a rigid support material configured to support the weight of additional filter stages placed on top of it without deforming.

4. The apparatus of claim 1, wherein at least one of the plurality of filter stages further comprises a raised portion of material around the outer edge, the raised portion configured to provide a standoff when placed upon another filter stage, providing an open space between filter stages when stacked within a modular filtration container.

* * * * *